US012561782B2

(12) United States Patent (10) Patent No.: US 12,561,782 B2
Chen et al. (45) Date of Patent: Feb. 24, 2026

(54) PANEL DESIGN TO IMPROVE ACCURATE DEFECT LOCATION REPORT

(71) Applicant: Orbotech Ltd., Yavne (IL)

(72) Inventors: Nai-Wei Chen, Tainan (TW);
Yueh-Nan Chen, Taichung (TW);
Chih-Chang Lai, New Taipei (TW);
Gwan Sub Lee, Incheon (KR); Jongho Lee, San Jose, CA (US)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 17/955,212

(22) Filed: Sep. 28, 2022

(65) Prior Publication Data

US 2023/0153977 A1 May 18, 2023

Related U.S. Application Data

(60) Provisional application No. 63/280,599, filed on Nov. 17, 2021.

(51) Int. Cl.
*G09G 3/34* (2006.01)
*G06T 7/00* (2017.01)
(Continued)

(52) U.S. Cl.
CPC .............. *G06T 7/0004* (2013.01); *G06T 7/73* (2017.01); *G09G 3/007* (2013.01); *G09G 3/3406* (2013.01);
(Continued)

(58) Field of Classification Search
CPC ..................... G06T 7/0004; G06T 7/73; G06T 2207/30121; G09G 3/007; G09G 3/3406;
(Continued)

(56) References Cited

U.S. PATENT DOCUMENTS 5,506,516 A    4/1996   Yamashita et al.
6,151,153 A   11/2000   Bryan
(Continued)

FOREIGN PATENT DOCUMENTS

WO        2010036818 A1    4/2010

OTHER PUBLICATIONS

Israel Patent Office, International Search Report and Written Opinion for International Application No. PCT/IB2022/059767, Jan. 31, 2023, 8 pages.

*Primary Examiner* — Michael A Faragalla
(74) *Attorney, Agent, or Firm* — Suiter Swantz IP

(57) ABSTRACT

An array checker (AC) is described. The array checker may include software configured to implement a method. By implementing the method, the array checker may detect a location of a defect and then compensate for a shift in the defect. In particular, the method may include generating one or more reference lines in a panel. The reference lines may include a location which is known prior to generating an image of the panel. The array checker may then capture an image of the panel. The image may be captured by voltage imaging. The image may include the defect and the one or more reference lines. The method may then include calculating an offset of the reference line from the known location. The offset may then be applied to the defect location for compensating the shift in the defect.

18 Claims, 6 Drawing Sheets

100

102 — ACTIVATE REFERENCE LINES

104 — IMAGE AN ACTIVE AREA OF A PANEL

106 — DETECT DEFECT LOCATION AND REFERENCE LINE LOCATION

108 — DETERMINE OFFSET OF REFERENCE LINE

110 — DETERMINE ACTUAL DEFECT LOCATION BASED ON DEFECT LOCATION AND OFFSET

112 — REPAIR DEFECT AT ACTUAL DEFECT LOCATION

(51) Int. Cl.

| | |
|---|---|
| *G06T 7/73* | (2017.01) |
| *G09G 3/00* | (2006.01) |
| *G09G 3/36* | (2006.01) |

(52) U.S. Cl.
CPC .. *G09G 3/3648* (2013.01); *G06T 2207/30121* (2013.01); *G09G 2300/043* (2013.01); *G09G 2320/0693* (2013.01); *G09G 2330/10* (2013.01); *G09G 2330/12* (2013.01)

(58) Field of Classification Search
CPC ........... G09G 3/3648; G09G 2300/043; G09G 2320/0693; G09G 2330/10; G09G 2330/12; G09G 3/006; G06K 9/00; G06K 9/48; G06K 9/62

See application file for complete search history.

(56) References Cited

U.S. PATENT DOCUMENTS

| | | | | |
|---|---|---|---|---|
| 6,211,991 | B1 | 4/2001 | Bryan | |
| 6,866,887 | B1 | 3/2005 | Chen et al. | |
| 7,099,067 | B2 | 8/2006 | Chen | |
| 7,817,333 | B2 | 10/2010 | Chen | |
| 8,801,964 | B2 | 8/2014 | Chen | |
| 2004/0246015 | A1 | 12/2004 | Chung | |
| 2007/0105245 | A1* | 5/2007 | Funakoshi | G03F 1/84 |
| | | | | 438/14 |
| 2010/0100356 | A1 | 4/2010 | Tsutsui | |
| 2010/0177313 | A1* | 7/2010 | Jun | G02F 1/1309 |
| | | | | 356/366 |
| 2010/0303334 | A1* | 12/2010 | Kitamura | G06V 10/22 |
| | | | | 382/141 |
| 2012/0105425 | A1* | 5/2012 | Sasanuma | G02F 1/134336 |
| | | | | 345/212 |
| 2014/0266244 | A1 | 9/2014 | Minaev et al. | |
| 2015/0097592 | A1* | 4/2015 | Lee | G09G 3/006 |
| | | | | 324/760.02 |

\* cited by examiner

<u>100</u>

102 — ACTIVATE REFERENCE LINES

104 — IMAGE AN ACTIVE AREA OF A PANEL

106 — DETECT DEFECT LOCATION AND REFERENCE LINE LOCATION

108 — DETERMINE OFFSET OF REFERENCE LINE

110 — DETERMINE ACTUAL DEFECT LOCATION BASED ON DEFECT LOCATION AND OFFSET

112 — REPAIR DEFECT AT ACTUAL DEFECT LOCATION

200a

200b

300

PANEL DESIGN TO IMPROVE ACCURATE DEFECT LOCATION REPORT

CROSS-REFERENCE TO RELATED APPLICATION

The present application claims the benefit under 35 U.S.C. § 119(e) of U.S. Provisional Application Ser. No. 63/280,599, filed Nov. 17, 2021, which is incorporated herein by reference in their entirety.

TECHNICAL FIELD

The present invention generally relates to flat panel displays, and more particularly to the detection of defects in the flat panel displays.

BACKGROUND

Production defects may occur in flat panel displays during one or more production steps. The production defects may limit product yield and adversely impact costs for the flat panel displays. Array checker (AC) systems may be used to check panels for the production defects. The array checkers may accurately report the defect location of the pixels when the pixels are sufficiently large. However, the array checkers may experience accuracy problems as the size of the pixels decrease. The decrease in accuracy for small sized pixels may cause the array checkers to inaccurately determine the location of the defect. The inaccurate location of the pixel defect may cause a defect repair system to repair the wrong pixel on the array. Therefore, it would be advantageous to provide a device, system, and method that cures the shortcomings described above.

SUMMARY

A method is described, in accordance with one or more embodiments of the present disclosure. In some embodiments, the method may include activating one or more reference lines in an active area of a panel. In some embodiments, the one or more reference lines include a known reference line location in the active area. In some embodiments, the method includes generating an image of at least a portion of the panel. In some embodiments, the method includes detecting, in the image, a defect location in the active area and a reference line location of the one or more reference lines. In some embodiments, the method includes determining an offset between the reference line location and the known reference line location. In some embodiments, the offset corresponds to a shift in the image and also the defect location. In some embodiments, the method includes determining a compensated defect location of the defect based on the defect location and the offset.

An array checker is described, in accordance with one or more embodiments of the present disclosure. In some embodiments, the array checker includes an illumination source configured to generate illumination. In some embodiments, the array checker includes a stage for a panel. In some embodiments, the array checker includes an electro-optic modulator disposed in a path of the illumination and separated from the panel by an airgap. In some embodiments, the array checker includes a detector configured to generate an image of at least a portion of the panel. In some embodiments, the array checker includes one or more processors configured to execute program instructions maintained on a memory medium. In some embodiments, the program instructions cause the one or more processors to activating one or more reference lines in an active area of the panel. In some embodiments, the one or more reference lines include a known reference line location in the active area. In some embodiments, the program instructions cause the one or more processors to generate the image of at least the portion of the panel. In some embodiments, the program instructions cause the one or more processors to detect, in the image, a defect location in the active area and a reference line location of the one or more reference lines. In some embodiments, the program instructions cause the one or more processors to determine an offset between the reference line location and the known reference line location. In some embodiments, the offset corresponds to a shift in the defect location. In some embodiments, the program instructions cause the one or more processors to determine a compensated defect location of the defect based on the defect location and the offset.

An imaging system is described, in accordance with one or more embodiments of the present disclosure. In some embodiments, the imaging system includes a panel. In some embodiments, the panel includes an active area, a plurality of gate lines, and a plurality of data lines. In some embodiments, the active area includes a plurality of active segments. In some embodiments, the imaging system includes the array checker. In some embodiments, the array checker includes an illumination source configured to generate illumination. In some embodiments, the array checker includes a stage for a panel. In some embodiments, the array checker includes an electro-optic modulator disposed in a path of the illumination and separated from the panel by an airgap. In some embodiments, the array checker includes a detector configured to generate an image of at least a portion of the panel. In some embodiments, the array checker includes one or more processors configured to execute program instructions maintained on a memory medium. In some embodiments, the program instructions cause the one or more processors to activating one or more reference lines in an active area of the panel. In some embodiments, the one or more reference lines include a known reference line location in the active area. In some embodiments, the program instructions cause the one or more processors to generate the image of at least the portion of the panel. In some embodiments, the program instructions cause the one or more processors to detect, in the image, a defect location in the active area and a reference line location of the one or more reference lines. In some embodiments, the program instructions cause the one or more processors to determine an offset between the reference line location and the known reference line location. In some embodiments, the offset corresponds to a shift in the defect location. In some embodiments, the program instructions cause the one or more processors to determine a compensated defect location of the defect based on the defect location and the offset.

BRIEF DESCRIPTION OF THE DRAWINGS

The numerous advantages of the disclosure may be better understood by those skilled in the art by reference to the accompanying figures.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to an imaging system including an array checker and a panel. The array checker may be configured to generate an image of the panel by voltage imaging. The image may then be used by the array checker for detecting a location of one or more defects in the panel. Embodiments of the present disclosure are directed to methods implemented by the array checker for compensating for a shift in the image captured by the array checker when detecting the defect location. Embodiments of the present disclosure are directed to a design of the panel. The panel design may be used in combination with the array checker to improve the accuracy of the defect location. The panel may include one or more switches for switching on a reference line. Embodiments of the present disclosure are directed to improving the accuracy of the data address for the defective pixel using the array checker in combination with the panel.

Imaging systems are generally described in U.S. Patent Publication 2015/0097592, entitled "DIRECT TESTING FOR PERIPHERAL CIRCUITS IN FLAT PANEL DEVICES" filed on Oct. 7, 2014; U.S. Patent Publication 2014/0266244, entitled "SYSTEMS AND METHODS FOR REAL-TIME MONITORING OF DISPLAYS DURING INSPECTION" filed on Oct. 7, 2014; U.S. Pat. No. 6,151, 153, entitled "MODULATOR TRANSFER PROCESS AND ASSEMBLY", issued on Nov. 21, 2000; U.S. Pat. No. 6,211,991, entitled "MODULATOR MANUFACTURING PROCESS AND DEVICE", issued on Apr. 3, 2001, U.S. Pat. No. 6,866,887, entitled "METHOD FOR MANUFAC- TURING PDLC-BASED ELECTRO-OPTIC MODULA- TOR USING SPIN COATING", issued on Mar. 15, 2005; U.S. Pat. No. 7,099,067, entitled "SCRATCH AND MAR RESISTANT PDLC MODULATOR", issued on Aug. 29, 2006; U.S. Pat. No. 7,817,333, entitled "MODULATOR WITH IMPROVED SENSITIVITY AND LIFETIME", issued on Oct. 19, 2010; and U.S. Pat. No. 8,801,964, entitled "ENCAPSULATED POLYMER NETWORK LIQ- UID CRYSTAL MATERIAL, DEVICE AND APPLICA- TIONS", issued on Aug. 12, 2014, which are each incorpo- rated herein by reference in the entirety.

Figure 1:
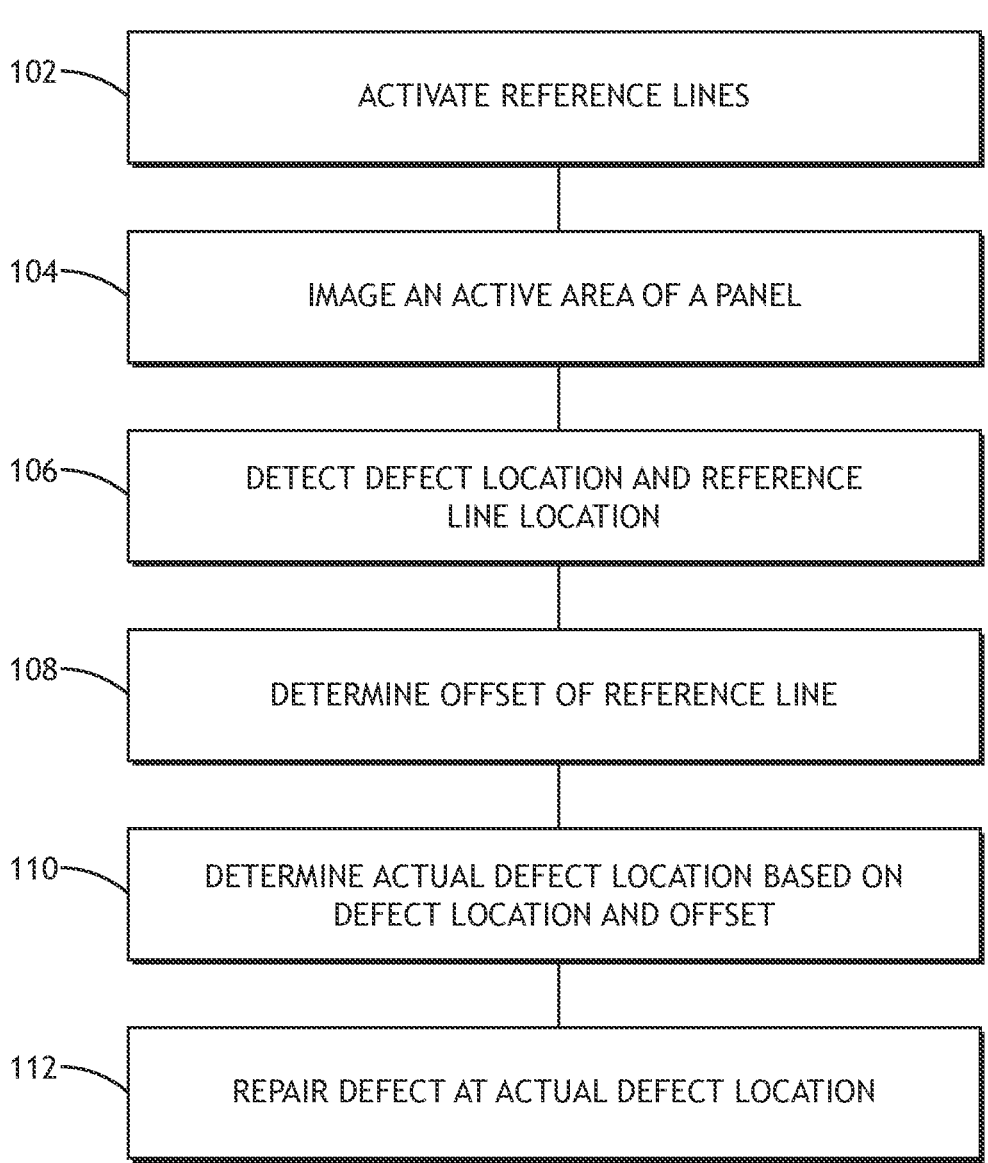
FIG. 1 depicts a flow diagram of a method to compensate for shifts in an image when voltage imaging, in accordance with one or more embodiments of the present disclosure.

FIG. 1 is a flow diagram illustrating steps performed in a method 100 to compensate for shifts in an image when voltage imaging, in accordance with one or more embodi- ments of the present disclosure. The embodiments and the enabling technologies described in the context of the panel 200, the imaging system 300, and/or the array checker 301 should be interpreted to extend to the method 100. It is further noted, however, that the method 100 is not limited to the architecture of the panel 200, the imaging system 300, and the array checker 301.

In a step 110, one or more reference lines in an active area of a panel are activated. Activating the reference lines may also refer to charging the reference lines such that the reference lines capacitively couple to an electro-optic modu- lator. The reference lines may be charged in a similar manner to a defect, such that both the reference lines and the defects exhibit similar behavior in switching the electro-optic modu- lator. When the reference lines are activated, the active array may display the reference lines. The reference line may be activated in any manner. For example, a switch may be used to activate the reference line. The switch may be controlled by a signal from an array checker. The array checker may activate the switch and similarly activate one or more of the reference lines. The switches may be used to create the reference lines during imaging. The reference lines may be advantageous for calculating a shift in an image captured by an array checker. In embodiments, the reference line may include a known reference line location in the active area. The address of the reference line may be known a priori. The known reference line location may correspond to one or more data line or gate lines are coupled to the switch. Activating the reference lines may refer to supplying the reference lines with a voltage.

In a step 120, an image of at least a portion of the active area of the panel may be generated. The image may be generated by an array checker. The array checker may use voltage imaging to generate the image. In some instances, the image of the active area may be a two-dimensional image of a voltage distribution across the active area. The voltage distribution may be determined by illuminating the active area with optical energy passing through an electro- optic modulator. In embodiments, the image may include one or more defects and the one or more reference lines. For example, the defects and/or reference lines may correspond to areas where the electro-optic modulator is locally opaque to light from an illumination source of an array checker. The electro-optic modulator may be locally opaque above the defect and the reference line. For instance, the defect and the reference line may include a charge causing the electro-optic modulator to be locally opaque. The other portions of the active region may include a charge causing the electro-optic modulator to be locally translucent. The light may thus indicate the defect and the reference line by the transmission through the electro-optic modulator. The light, and similarly the voltage distribution, may then be captured as the image by a detector (e.g., a charge-coupled device (CCD)) of the array checker. The detector may generate the image in any image format. The image may include a plurality of pixels. The pixels may correspond to one or more portions of the active area (e.g., subpixels or active regions of the active area). In some instances, the image includes the entire active area, although this is not intended as a limitation of the present disclosure. It is further contemplated that the image may include a subset of the active area. The image may be also be referred to as a voltage image and/or voltage imaging optical system (VIOS™) image.

In a step 130, a defect location and a reference line location are detected. The defect location and the reference line location may be detected in the image by a controller of the array checker. For example, the controller may detect the areas which are locally translucent, due to a change in the voltage distribution. The defect location may be detected based on an address of a defect in the image of the active area. Similarly, the reference line location may be detected based on an address of the reference line in the image of the active area.

In a step 140, an offset of the reference line location from the known reference line location is determined. The image may include a shift in the reference line from the known address. The known reference line location may be known a priori and may be based on the address of the switches on the data lines and/or the gate lines. The location of the reference line in the image may be shifted by one or more pixels from the actual address of the reference line. The shift may cause the reference line location determined in step 130 to be offset from the known reference line location. For example, the array checker may include a software feature to calculate and compare the location of the reference line with the actual reference line to determine a shift in the image. The array checker may detect the offset by determining the difference between the detected reference line location and the actual reference line location. The offset may correspond to a shift in the image and similarly a shift in the defect location. Thus, determining the offset of the reference line location from the known reference line location may be beneficial in determining the shift of the image and the defect location.

In a step 150, a compensated defect location of the defect is determined based on the defect location and the offset. For example, the defect location may be added to or subtracted from based on the offset. The shift in the reference line may be applied to the point defect address to improve the defect location detection capability of the array checker. The compensated defect location may then provide an improved accuracy for the array checker. The ability to detect the defect location with improved accuracy may be beneficial for relatively small pixel sizes.

In a step 160, the defect may be repaired. The defect may be repaired using any suitable method. The array checker may report the compensated defect location to implement repairs for the defect. For example, the compensated defect location may be reported from the array checker to a thin-film transistor (TFT) array repair tool. The TFT array repair tool may use the compensated defect location together with one or more repair recipes to repair the defect. The compensated defect location may allow for an increase in the success of repairs on the panels. Yield for the panels may be improved by the increase in the success of repairs.

It is contemplated that the method 100 may be particularly advantageous for detecting a location of one or more defects in active segments of the panel as the size of the active segments decrease (e.g., as pixels-per-inch (PPI) increases). For example, the method 100 may be advantageous in allowing an array checker to accurately detect the defect location of the active segment (e.g., subpixel) where the active segment is on the order of 100 micrometers or smaller. For instance, the method 100 may allow an array checker to accurately detect a location of a defect in one or more of the active segments where the active segment has a width of at least 30 micrometers. In particular, the method 100 may be advantageous for compensating for a shift in the defect location.

The various step may or may not be performed sequentially. It is further contemplated that the various steps may be performed contemporaneously. For example, the location of the defect may be detected and then the reference line may be generated. By way of another example, the reference line may be generated and then panel may be scanned for both the defect and the reference line. After finding the defect and the reference line, the offset amount may be then calculated.

It is further contemplated that each of the embodiments of the method described above may include any other step(s) of any other method(s) described herein. Although not depicted, the method 100 may further include one or more additional steps. For example, the method 100 may include, but is not limited to, glass (e.g., panel) loading, alignment, stage movement, and/or glass scrubbing. The loading, alignment, stage movement, and/or glass scrubbing may or may not occur before the step 110.

Referring now to FIGS. 2A-2E, a panel 200 is described, in accordance with one or more embodiments of the present disclosure. The panel 200 may also be referred to as a liquid-crystal display (LCD) panel, a thin film transistor (TFT) panel, a TFT arrays, a display panel, and the like. The panel 200 may include any type of LCD panel, such as, but not limited to, an active-matrix LCD (AMLCD) panel, a twisted nematic (TN) LCD panel, a vertical alignment (VA) LCD panel, an in-plane switching (IPS) LCD panel, and the like. Similarly, the panel 200 may include any generation of LCD panel.

The panel 200 may include one or more layers for functioning as the LCD panel, such as, but not limited to, one or more polarizers, one or more color filters, a liquid crystal, a TFT backplane, a backlight, and the like. Backplane may refer to an electrode connection, which may or may not be spread across multiple backplanes. In some instances, the panel 200 may or may not include the polarizers, the color filters and/or the LCD panel at the time of inspection (e.g., inspection by voltage imaging). For example, the panel 200 may not include the polarizer, the color filter, and/or the LCD panel at the time of inspection to allow for the ability to detect a location of a defect in the TFT backplane and remedy the defect using the detected location.

The panel 200 may include one or more TFT arrays formed on a substrate, such as a clear plate of thin glass. The TFT arrays may include one or more printed layers. The printed layers may be formed on the substrate by a number of processes, such as, but not limited to, one or more material deposition steps, one or more lithography steps, one or more etching steps, and the like. The fabrication may occur in stages, where a material (e.g., indium tin oxide (ITO), etc.) is deposited over a previous layer or on the glass substrate, according to a process pattern. During fabrication, the printed layers are fabricated within selected tolerances to properly construct the final device. The printed layers may exhibit defects which are outside of the selected tolerances. Characteristics of the TFT array may be measured to detect the defects. In embodiments, the panel 200 includes a thin-film transistor (TFT) array.

The panel 200 may include one or more components. For example, the panel 200 may include, but is not limited to, an active area 202, one or more gate lines 204, one or more data lines 206, a fanout 208, and the like.

The active area 202 of the panel 200 may be used for displaying various information. The size of the active area 202 may be used for defining a size of the panel 200. For example, a large panel may be the size of a television (e.g., 30-inch display or greater). By way of another example, a small panel may be the size of a handheld smartphone (e.g., 6-inch, 7-inch, etc.). Embodiments of the present disclosure are equally applicable to any size of panel.

Figure 2A:
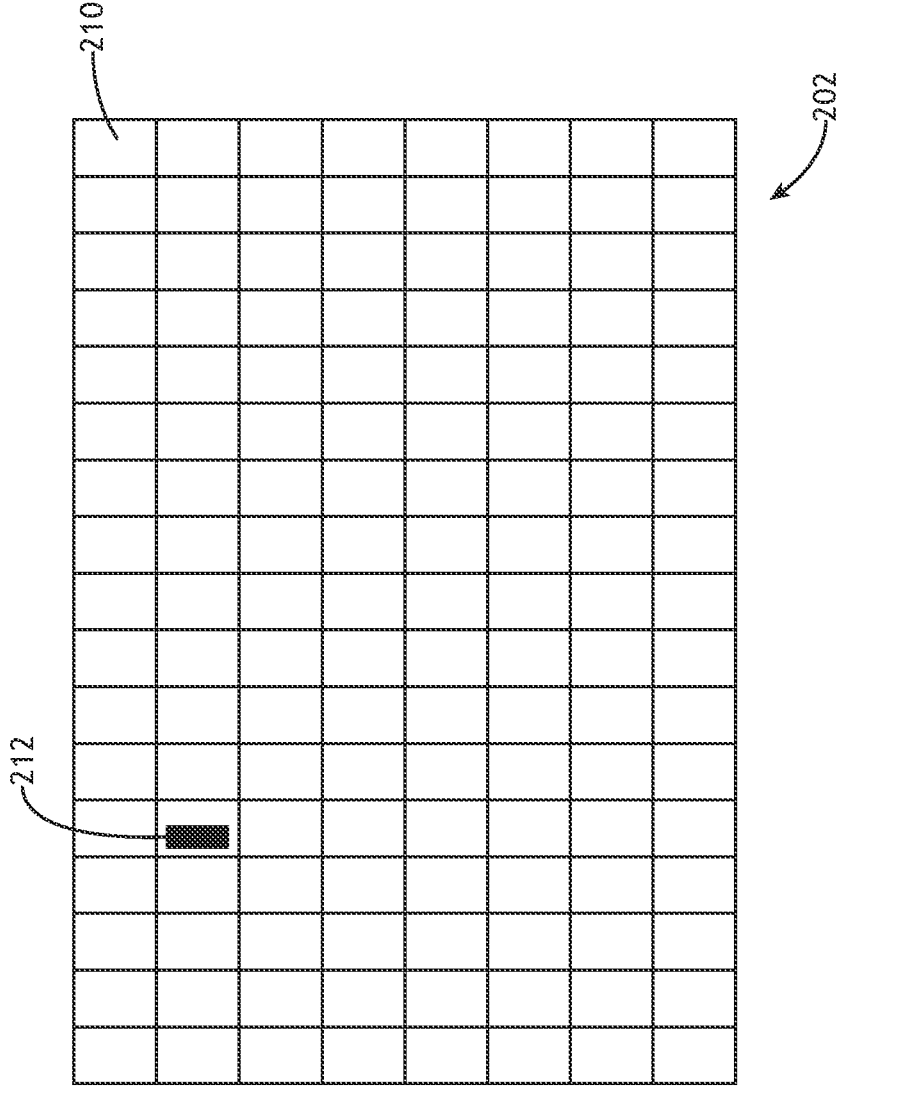
FIG. 2A depicts a voltage image including active regions in an active area of a panel, in accordance with one or more embodiments of the present disclosure.
Figure 2B:
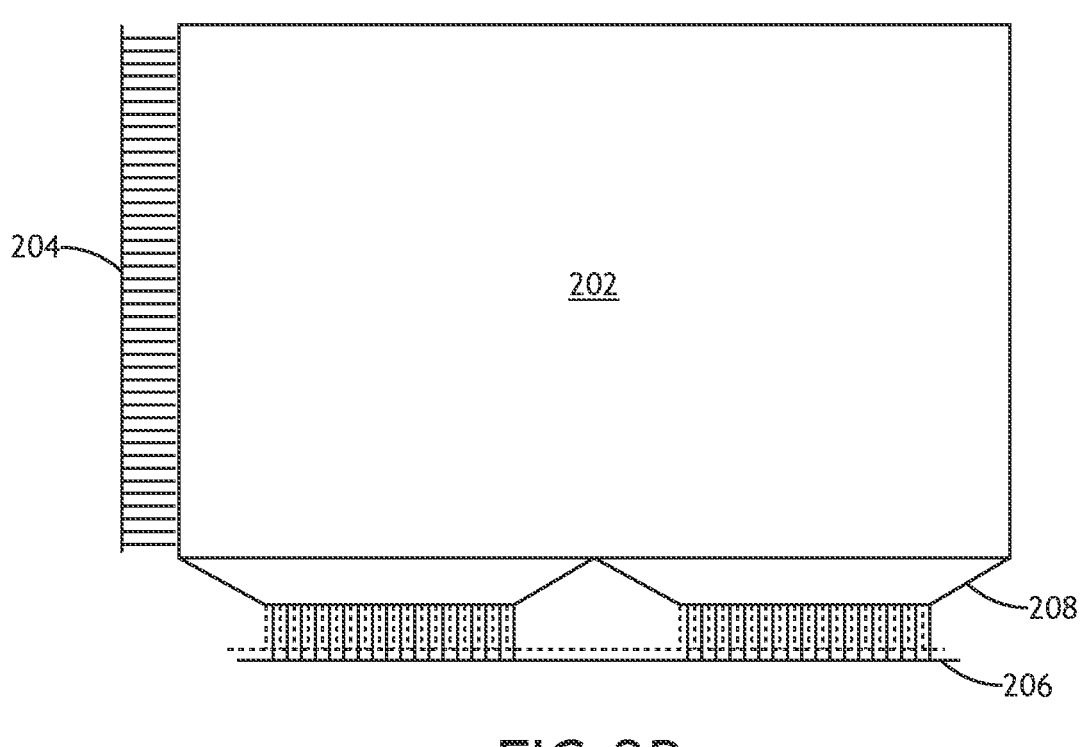
FIG. 2B depicts a panel, in accordance with one or more embodiments of the present disclosure.

The active area 202 may refer to an area of the panel 200 which includes one or more active segments 210. As depicted in FIG. 2A (e.g., panel 200a) and FIG. 2E (e.g., panel 200d), the active segments 210 are depicted as squares. Each active segments 210 may include one or more components, as is known in the art. For example, the active segments 210 may include, but are not limited to, a thin-film transistor (TFT), a pixel electrode, a storage capacitor, and the like. The active segments 210 may also be referred to as a unit pixel and/or a subpixel. Generally, three active segments 210 may be used to form a pixel. The pixel may also be referred to as a color pixel or a RGB pixel. The number of the active segments 210 (and similarly the number of pixels) may be selected to define a resolution of the panel 200. The active segments 210 may include any suitable dimension. For example, FIG. 2E is depicted as including 5760 by 1080 of the active segments 210 for a full-HD resolution display with three color pixels, although this is not intended as a limitation of the present disclosure. The active area 202 may include any number of subpixel or pixels to achieve a desired resolution.

In embodiments, the panel 200 may include one or more gate lines 204 and/or one or more data lines 206. The panel 200 may also be considered a matrix display and/or a dot matrix by the gate lines 204 and/or the data lines 206. The gate lines 204 and/or the data lines 206 may be coupled to the active segments 210 of the active area 202 in any manner known in the art. Each of the active segments 210 may be coupled to one of the gate lines 204 and one of the data lines 206. For example, all active segments 210 in a column of the active area 202 may be coupled to the gate line 204. Each column may then include a separate gate line 204. The gate line 204 may also be considered horizontal lines. By way of another example, all active segments 210 in a row of the active area 202 may be coupled to the data line 206. Each column may then include a separate data line 206. The data lines 206 may also be considered vertical lines. The data lines 206 may also be referred to as source lines. The data line may be used to send a signal into the active segments 210. The gate lines 204 and the data lines 206 may then be coupled to the various components (e.g., the TFT, the pixel electrode, the storage capacitor, etc.) of the active segments 210 in a manner known in the art.

Figure 2C:
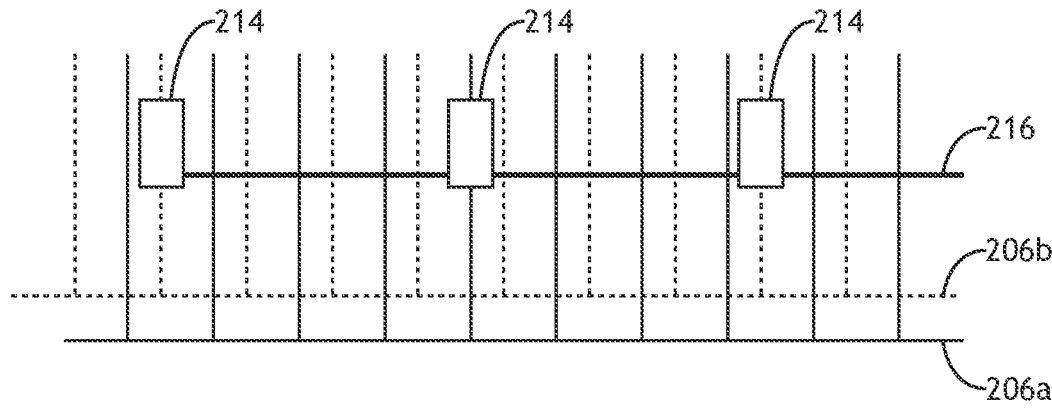
FIG. 2C depicts a view of a data line of a panel including one or more switches, in accordance with one or more embodiments of the present disclosure.

As depicted in FIG. 2C, the panel 200 may include a data line 206a and a data line 206b, although this is not intended to be limiting. For example, every other row of the active area 202 may be controlled by the data line 206a. Similarly, every other row of the active area 202 may be controlled by the data line 206b. The panel 200 may include any number of the gate lines 204 and/or data lines 206 coming from an integrated circuit.

A relative location of the subpixels in the active area 202 may be used to denote the subpixels. As may be understood, the specific nomenclature used to refer to the position of the subpixels is not intended to be limiting. In one example, the panel includes an array of M by N subpixels. A top-left subpixel of the array may be referred to as a subpixel (1,1). A top-right subpixel of the array may be referred to as a subpixel (1, N). A bottom-left subpixel of the array may be referred to as a subpixel (M, 1). A bottom-right subpixel of the array may be referred to as a subpixel (M, N). This nomenclature is not intended to be limiting. Any reference point may be used for designating the relative position of the subpixels in the active area 202.

The active segments 210 may include one or more defects 212. The defect 212 may include any defect known in the art. For example, the defect 212 may include, but is not limited to, metal protrusions, indium tin oxide (ITO) protrusions, mouse bites, open circuits, shorts, foreign particles, mask problems, over etching, and the like.

Figure 2D:
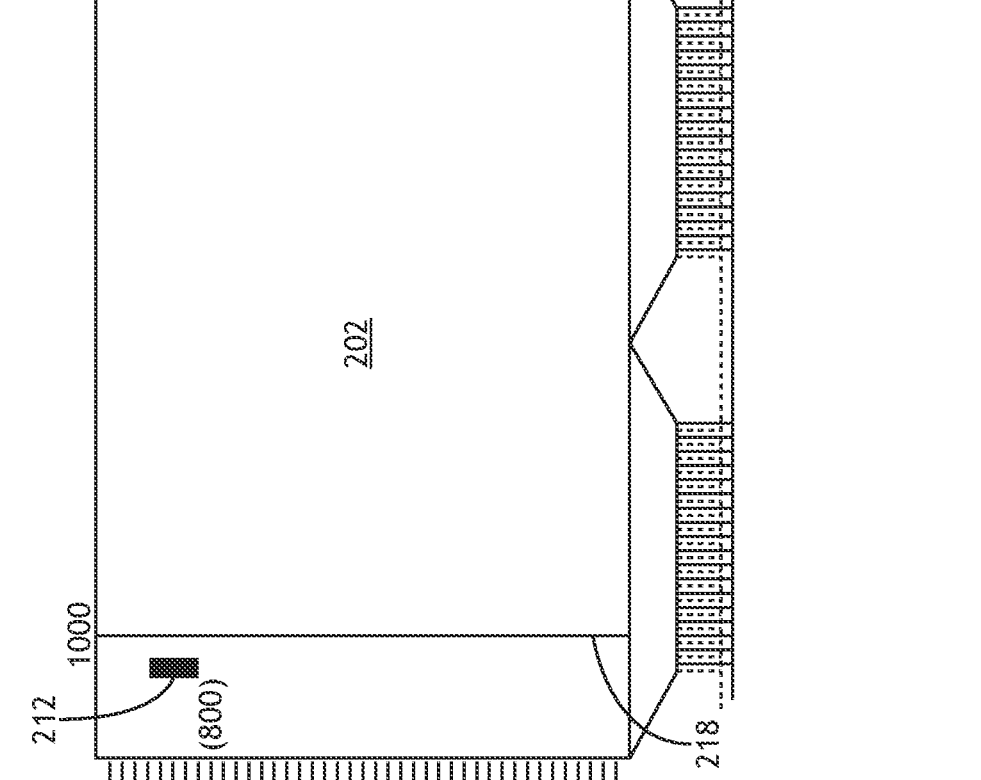
FIG. 2D depicts a panel with an active area including a vertical reference line and an active region with a defect, in accordance with one or more embodiments of the present disclosure.
Figure 2E:
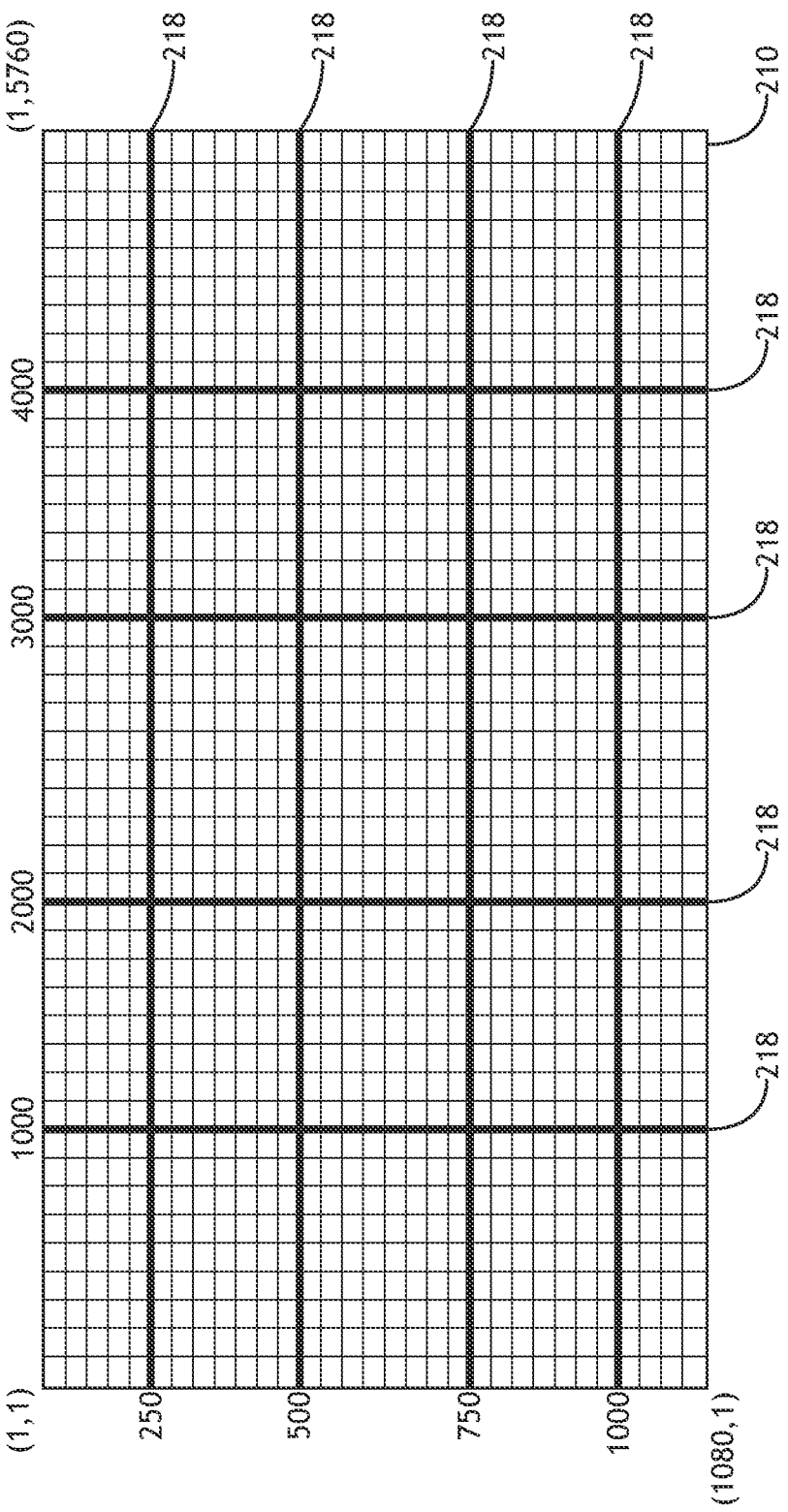
FIG. 2E depicts a voltage image of an active area of a panel including horizontal reference lines and vertical reference lines, in accordance with one or more embodiments of the present disclosure.

A location of the defects 212 in the active segments 210 may be determined. The location of the defects 212 may be determined in any manner, such as, but not limited to, by an array checker configured to voltage image the panel 200. The location of the defect may then be reported based on the subpixel address. The subpixel address may then be used to correct the defect. As depicted in FIG. 2D, the defect 212 is depicted with a horizontal location or address of 800 subpixels from the left. This location may be determined without compensation.

In embodiments, the panel 200 may be designed such that one or more of the gate lines 204 and/or one or more of the data lines 206 drive one or more reference lines 218. The reference lines 218 may also be referred to as line defects in the active area 202. The reference lines 218 may be caused by intentionally causing a line defect in the active area 202. The reference lines 218 may be horizontal and/or vertical. As depicted in FIG. 2D, the defect 212 may be adjacent to the reference line 218 which is disposed at the known address of 1000 subpixels from the left. This reference line may be used to calculate a shift in the image. For example, the reference line may be measured to be at 1001 pixels from the left, corresponding to an offset of 1 pixel. The shift in the image may then be applied to correct for the shift in the position of the defect 212. Although FIG. 2D depicts one vertical reference line, this is not intended as a limitation of the present disclosure. Any number of the reference lines 218 may be captured in the image. The reference lines 218 may include a known location on the active area. For example, FIG. 2E depicts the reference lines 218 to be at a known address of 1000, 2000, 3000, 4000 along the horizontal direction, although this is not intended to be limiting. By way of another example, FIG. 2E depicts the known location to be at an address of 250, 500, 750, and 1000 along the horizontal direction, although this is not intended to be limiting. The reference lines 218 may be used in a manner described in the method 100 for determining a shift in the image and compensating for the shift in the location of the defect 212. For example, the detected location of the reference lines 218 may be compared with the known location to detect the shift in the image, and similarly the shift in the detected location of the defect 212.

The reference line 218 may be captured in the voltage image or a VIOS image. The reference line 218 may include a line address which is predetermined. The defect 212 may also be captured in the voltage image. The defect 212 may occur near the reference line 218. An array checker may see several reference lines in the image. The reference lines may then be detected from the image. The reference line address may then be used to compensate the point different location. The line address of the reference line 218 may be used to compensate the defect address.

In embodiments, the panel 200 may include one or more switches 214. As may be understood, the switches 214 may generally include any switch such as a transistor. The transistor may include, but is not limited to, a field-effect transistor such as a metal-oxide-semiconductor field-effect transistor (MOSFET or M).

The switches 214 may be used to switch on and off the reference lines 218 driven by the gate lines 204 and/or the data lines 206. The switches 214 may be switched on or off to generate the reference line 218. The switches 214 may thus be used to create the reference line 218. The switches 214 may be coupled to the data line 206 for generating vertical reference lines. For example, FIG. 2C depicts the switches 214 coupled to the data line 206*a*, although this is not intended to be limiting. The switches 214 may also be coupled to the data line 206*b*. However, coupling to the data line 206*a* may provide sufficient spacing to achieve a sufficient level of accuracy to determine the shift in the image. The switches 214 may also be coupled to the gate lines 204 for generating horizontal reference lines. Although not depicted, the gate lines 204 may also include the switches 214 (and similarly the signal lines 216). The gate lines 204 may then be switched for generating the horizontal reference lines.

The panel 200 may include any number of the switches 214. The number of the switches may be balanced by one or more factors. For example, the number of switches may be balanced between a desire for a more reference lines for offset detection against fabrication costs associated with the switches 214. The amount of reference lines 218 per panel may be adjusted by adjusting the number of the switches 214. For example, the amount of reference lines 218 may be increased to increase the accuracy of the defect location. In this regard, the defects 212 may be closer to the reference lines 218 as the number of reference lines increases. Similarly, the amount of reference lines 218 may be increased as the size of the panel 200 is increased. If the panel is large, the number of reference lines may be increased. If the panel is small, the number of reference lines may be decreased. For example, a small panel (e.g., a smartphone) may include two or three reference lines. As depicted in FIG. 2E, the panel 200 is depicted with four reference lines in the vertical direction and four reference lines in the horizontal direction, although this is not intended to be limiting.

Each of the switches 214 may correspond to an address on the gate lines 204, the data lines 206, and/or the reference lines 218. The panel 200 may include any interval for the addresses. For example, the address for the switches 214 may be every one hundred lines (e.g., 100, 200, 300, etc.), every 250 lines (e.g., 250, 500, 750, 1000, etc.), every thousand lines (e.g., 1000, 2000, 3000, 4000, etc.), or some other interval. As depicted in FIG. 2E, the vertical reference lines are depicted at address of 1000, 2000, 3000, and 4000, although this is not intended to be limiting. As further depicted in FIG. 2E, the horizontal reference lines are depicted at address of 250, 500, 750, and 1000, although this is not intended to be limiting.

A control signal may be used to activate the switches 214 causing the reference lines 218 to be active. In embodiments, the panel 200 may include one or more signal lines 216. The signal lines 216 may be used to provide a control signal to the switch 214. The switches 214 may receive a signal to control the reference line 218 by the signal lines 216. The control signal may cause the switch 214 to activate for driving the charge of the reference lines 218. The panel 200 may also include one or more pads (not depicted). The pads may be used to couple the signal lines 216 to an integrated circuit and the like. For example, the pads may be used to couple an array checker (e.g., array checker 301). The array checker may then provide the signal for switching on the switches 214 to generate the reference lines 218. The signal line 216 may be coupled to a contact pad. The contact pad may receive a signal. For example, the contact pad may receive a signal from an integrated circuit and/or an array checker. The switches 214 may be advantageous in allowing the gate line 204 and/or the data line 206 to be controlled by transmitting a signal from an integrated circuit by way of the signal line 216.

In embodiments, the switches 214 are disposed outside the active area 202. The switches 214 may be coupled to the gate line 204 before the gate lines 204 go into the active area 202 (e.g., before a fanout). Similarly, the switches 214 may be coupled to the data line 206 before the data lines 206 go into the active area 202 (e.g., before the fanout 208). In this regard, the switches 214 may be disposed outside of the active area 202.

Referring now in particular to FIG. 2D, a panel 200*c* is described, in accordance with one or more embodiments of the present disclosure. The panel 200*c* may provide an example of compensating for horizontal shift in the defect location. An array checker (e.g., array checker 301) may determine the horizontal location for the defect 212 is at 800 pixels from a left side of the panel. The array checker may also determine the horizontal location for the reference line 218 is at 1001 pixels from the left side of the panel. The actual location of the reference line may be at 1000 pixels from the left side of the panel. The array checker may determine the difference between the actual location of the reference line and the determined location of the reference line is 1 pixel (e.g., 1001 pixels minus 1000 pixels). The array checker may compensate for the point defect location based on the shift to determine a compensated point defect location of 799 pixels (e.g., 800 pixels minus 1 pixel shift). The array checker may then output the point defect location as being at 799 pixels from the left side of the panel. The output may be provided to a TFT repair tool for repairing the defect in the panel 200.

Referring now in particular to FIG. 2E, a panel 200*d* is described, in accordance with one or more embodiments of the present disclosure. Although the panel 200 is described as including the switches 214 for driving the reference lines 218, this is not intended as a limitation of the present disclosure. An alternate method of construction may involve using the panel 200*d* and making reference open lines as shown.

Figure 3:
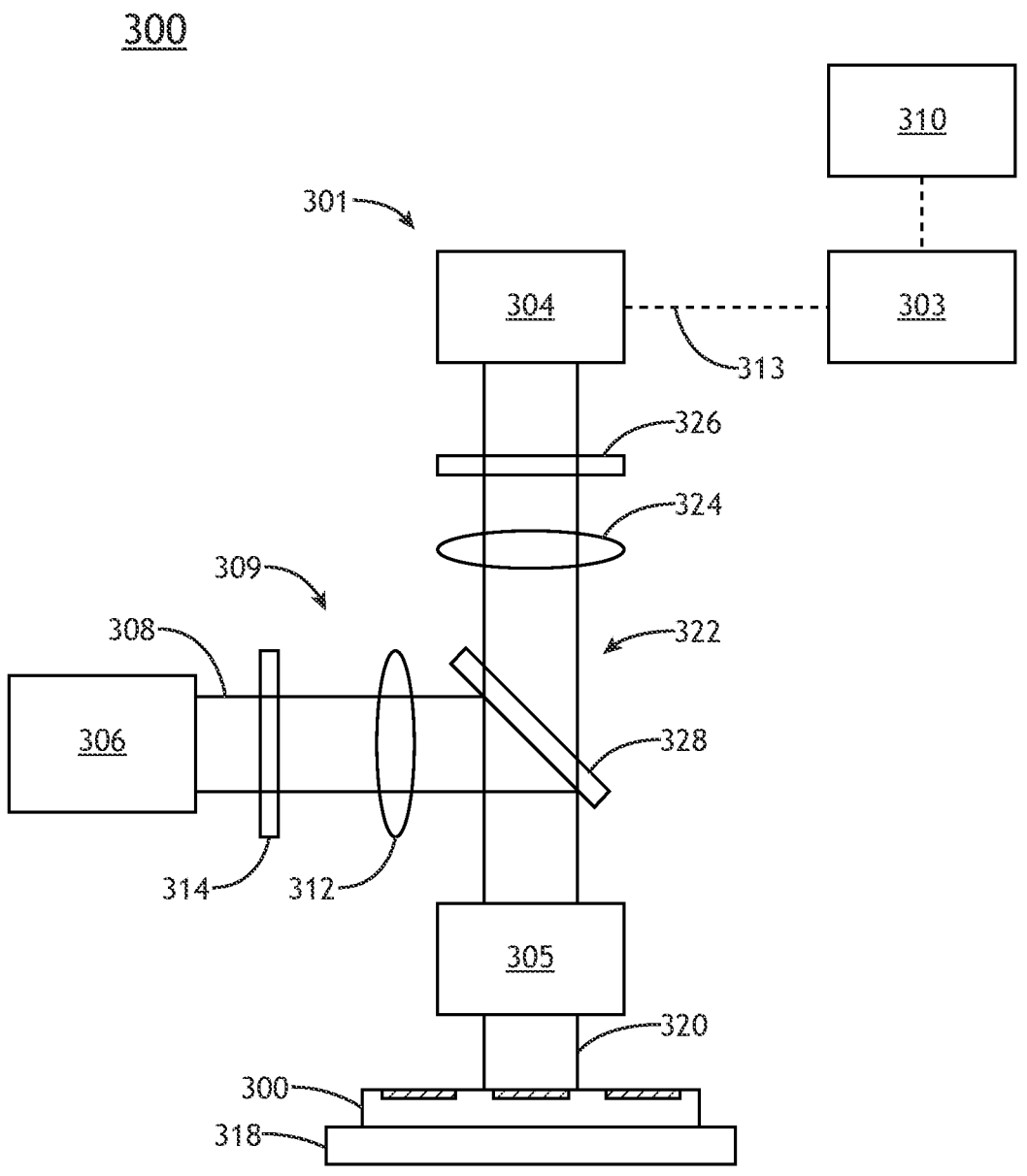
FIG. 3 illustrates a simplified view of an imaging system including an array checker and a panel, in accordance with one or more embodiments of the present disclosure.

FIG. 3 is a conceptual view illustrating an imaging system 300, in accordance with one or more embodiments of the present disclosure. The imaging system 300 may generally include any type of imaging tool suitable for imaging the panel 200. The imaging tool may include, but is not limited to, an array checker 301.

The array checker 301 may be configured to image the panel 200 by voltage imaging. Voltage imaging may be employed to detect and measure defects in flat panel thin film transistors (TFT) arrays. The performance of the TFT array is simulated as if it were assembled into a TFT cell and then the characteristics of the TFT array are measured by indirectly measuring actual voltage distribution on the panel, or so-called voltage imaging, using an electro-optic modulator (e.g., electro-optic modulator 305). The voltage imaging may be performed by the array checker 301. The array checker 301 may include one or more components for checking such TFT arrays or other panels. The array checker 301 may also be referred to as an array checker (AC) system. The array checker 301 may be advantageous for detecting defects in LCD panels before the panel includes a liquid crystal. In this regard, the panel 200 may or may not include the liquid crystal layer when the array checker 301 generates the image of the active area.

The array checker 301 may generate a defect location in the form of a data address. The defect location may be advantageous in allowing for remediation of the defect. In some embodiments, the defect location may correspond to a relatively large pixel size. For example, the relatively large pixel size may be on the order of a hundred micrometers or more. The array checker 301 may detect the defect location with sufficiently good accuracy to accurately detect the defect location for the relatively large pixel size without compensating for shifts in the image. However, the accuracy may be insufficient as the pixel size decreases. When the pixel size is very small the array checker may exhibit one or more inaccuracies. The inaccuracies may result in a shift of the reported defect location from the actual defect location. The inaccuracy of the defect location may similarly cause the reported data address of the defective pixel to be different than the actual data address of the defective pixel. Reporting the defect location with an address which is shifted from the actual location of the defect may be undesirable as the manufacturer may be unable to remedy the defect unless the actual location is known. The inaccuracy may be due to a number of factors. For example, the inaccuracy may be due a stage vibration, a glass rotation, and the like. The VIOS image may then have a shift in the defect location due to the inaccuracy.

In embodiments, the array checker 301 is configured to provide a control signal to the panel 200. The control signal may be used to control switches (e.g., switches 214) of the panel 200. The switch may cause a data line or a gain line to generate a reference line (e.g., reference line 218). For example, the controller 303 may be configured to generate the control signal. The voltage image captured by the array checker 301 may then include the reference lines. Thus, the array checker 301 may be used to control the switches and similarly the reference lines of the panel 200.

The array checker 301 may include various software for compensating for the shift in the image based on the detected position of the reference line and the known position of the reference line. For example, the array checker 301 may implement the method 100 in software. The array checker 301 may detect the reference line and the defect in images of the active area. The array checker 301 may determine an offset between the reference line location and a known location of the reference line. The array checker 301 may then use the offset to compensate the defect address. For example, the defect address may be compensated due to a shift in the image. The array checker 301 may thus report the defect location more accurately by the offset. Compensating for the shift in the voltage image may allow the array checker 301 to accurately detect the location of the defect as pixel sizes decrease.

The array checker 301 may include any number of components for detecting the defects. In embodiments, the array checker 301 includes an illumination source 306 to generate illumination 308. The illumination 308 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 306 may further generate illumination 308 including any range of selected wavelengths. In embodiments, the illumination source 306 may include a spectrally-tunable illumination source to generate illumination 308 having a tunable spectrum.

In embodiments, the illumination source 306 directs the illumination 308 to a panel 200 via an illumination pathway 309 (e.g., path). The illumination pathway 309 may include one or more lenses 312 or additional illumination optical components 314 suitable for modifying and/or conditioning the illumination 308. For example, the one or more illumination optical components 314 may include, but are not limited to, one or more polarizers, one or more filters, one or more splitters, one or more diffusers, one or more homogenizers, one or more apodizers, one or more shapers, one or more shutters (e.g., mechanical shutters, electro-optical shutters, acousto-optic shutters, or the like), one or more aperture stops, and/or one or more field stops.

In embodiments, the array checker 301 includes an electro-optic modulator 305. The electro-optic modulator may be disposed in the path of the illumination 308 from the illumination source 306. The electro-optic modulator 305 may modulate one or more characteristics of the illumination 308. During operation, light transmits through portions of the electro-optical modulator 305, and defects can be detected by observing changes in the reflected or transmitted light. The electro-optic modulator 305 may be separated from a surface of the panel 200 by an airgap. The airgap may include a select number of microns (e.g., between 5-75 microns). A voltage bias may then be applied across a transparent electrode of a layer of indium tin oxide (hereinafter "ITO") on a surface of the electro-optic modulator 305. Thereupon, the electro-optic modulator 305 capacitively couples to the panel 200 so that an electric field associated with the panel 200 is sensed by one or more layers of the electro-optic modulator 305 (e.g., a layer including liquid crystals). The intensity of incident light transmitted through the liquid crystals of the electro-optic modulator are varied, (i.e., modulated), based on the electric field strength felt by the liquid crystals. For example, in areas where a normal pixel is located, a localized voltage potential is impressed (e.g., a capacitive coupling between the panel 200 and the electro-optic modulator 305) causing one or more films of the electro-optical modulator 305 to be locally translucent. In the locally translucent regions, light from the light source 306 is allowed to pass through the electro-optical modulator 305 and reflect from the panel 200, for passing through to a collection pathway 322 (e.g., for capture by detector 304). By way of another example, in areas where no voltage potential is impressed (e.g., no capacitive coupling), one or more films of the electro-optical modulator 305 remains locally opaque. In the case where the electro-optical modulator 305 is locally opaque, light from light source 306 is scattered or otherwise prevented from passing through to and reflect from the panel 200. Thus, a transmission-voltage (T-V) curve may be determined by applying the voltage. The intrinsic switching voltage of the electro-optic modulator 305 may correspond to the voltage across the electro-optic modulator 305 at which light transmission through the electro-optic modulator 305 has a maximum sensitivity to a change in voltage. For example, the switching voltage may correspond to the electric field strength at which a given percentage of liquid crystal molecules are substantially aligned with the electric field allowing for the light transmission. The electro-optic modulator 305 may be advantageous for a number of imaging tasks, such as to modulate a light source of the array checker 301 to assist in detecting one or more defects of the panel 200.

A stage 318 may support the panel 200. The stage 318 may include any device suitable for positioning the panel 200 within the array checker 301. The stage 318 may be provided for securing the panel 200. The stage 318 may secure the panel 200 using any mechanical or similar attachment means.

In embodiments, a detector 304 is configured to capture radiation emanating from the panel 200 (e.g., sample light 320) through a collection pathway 322. For example, the collection pathway 322 may include, but is not required to include, the electro-optic modulator 305, a collection lens (e.g., an objective lens), or one or more additional collection pathway lenses 324. In this regard, a detector 304 may receive radiation reflected or scattered (e.g., via specular reflection, diffuse reflection, and the like) from the panel 200 or generated by the panel 200 (e.g., luminescence associated with absorption of the illumination 308, or the like).

The system 300 may include, but is not limited to, a controller 303. The controller 303 may include one or more processors and memory, and may include or be coupled to a user interface 310. For example, the array checker 301 may include the controller 303, although this is not intended to be limiting.

The collection pathway 322 may further include any number of collection optical components 326 to direct and/or modify illumination collected by the electro-optic modulator 305 including, but not limited to one or more collection pathway lenses 324, one or more filters, one or more polarizers, or one or more blocks. Additionally, the collection pathway 322 may include field stops to control the spatial extent of the sample imaged onto the detector 304 or aperture stops to control the angular extent of illumination from the sample used to generate an image on the detector 304. In another embodiment, the collection pathway 322 includes an aperture stop located in a plane conjugate to the back focal plane of an optical element to provide telecentric imaging of the sample. In embodiments, the array checker 301 includes a beam splitter 328 oriented such that the electro-optic modulator 305 may simultaneously direct the illumination 308 to the panel 200 and collect radiation emanating from the panel 200.

The detector 304 may include any type of optical detector suitable for measuring illumination received from the panel 200. For example, the detector 304 may include, but is not limited to, a CCD detector, a TDI detector, a photomultiplier tube (PMT), an avalanche photodiode (APD), a complementary metal-oxide-semiconductor (CMOS) sensor, or the like. In another embodiment, the detector 304 may include a spectroscopic detector suitable for identifying wavelengths of light emanating from the panel 200.

In embodiments, the controller 303 is communicatively coupled to a detector 304. The controller 303 may include one or more processors configured to execute any of various process steps. In embodiments, the controller 303 is configured to generate and provide one or more control signals configured to perform one or more adjustments to one or more process tools based on image signals 313 from the detector 304.

The one or more processors of the controller 303 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors may include any device configured to execute algorithms and/or instructions (e.g., program instructions stored or maintained in memory). In one embodiment, the one or more processors may be embodied as a desktop computer, mainframe computer system, workstation, image computer, parallel processor, networked computer, or any other computer system configured to execute a program configured to operate or operate in conjunction with the array checker 301, as described throughout the present disclosure. Moreover, different sub-systems of the system 300 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 303 may include one or more controllers housed in a common housing or within multiple housings. In this way, any controller or combination of controllers may be separately packaged as a module suitable for integration into array checker 301. Further, the controller 303 may analyze data received from the detector 304 and feed the data to additional components within the array checker 301 or external to the array checker 301.

The memory medium may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors and controller. For instance, the one or more processors of controller 303 may access a remote memory (e.g., server), accessible through a network (e.g., internet, intranet and the like).

In embodiments, the user interface 310 is communicatively coupled to the controller 303. In embodiments, the user interface 310 may include, but is not limited to, one or more desktops, laptops, tablets, and the like. In embodiments, the user interface 310 includes a display used to display data of the system 300 to a user. The display of the user interface 310 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 310 is suitable for implementation in the present disclosure. In embodiments, a user may input selections and/or instructions responsive to data displayed to the user via a user input device of the user interface 310.

Referring generally again to FIGS. 1A-3, it is further contemplated that each of the embodiments of the method described above may include any other step(s) of any other method(s) described herein. In addition, each of the embodiments of the method described above may be performed by any of the systems described herein.

After defect detection has occurred, the panel 200 may then be used for displaying various imagery (e.g., normal display operations). After the reference line is deactivated, the data signal can go into the pixel without interference from the switches. A liquid crystal lay may be added to the panel 200. The panel may be cut and assembled to a display. The lines of the panel may then be used to display an image as normal. During the normal display operations, the switches 214 may be switched off and provide no impact on the active area 202. In this regard, the switches 214 may be switched off such that the reference lines 218 are not displayed during normal operations, which may be advantageous for ensuring no impact on viewing characteristics. Notably, the active area 202 may also show the reference line 218 if the display has a coupling to the signal lines 216 and uses a control signal on the signal lines 216 to trigger the switch 214 and similarly the reference line 218.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method comprising:

activating one or more reference lines in an active area of a panel, wherein the one or more reference lines include a known reference line location in the active area;

generating an image of at least a portion of the panel;

detecting, in the image, a defect location of a defect in the active area and a reference line location of the one or more reference lines;

determining an offset between the reference line location and the known reference line location, wherein the offset corresponds to a shift in the defect location; and determining a compensated defect location of the defect based on the defect location and the offset, wherein the defect is in an active segment of the panel, wherein the active segment has a width of at least 30 micrometers.

2. The method of claim 1, wherein the one or more reference lines are activated by switching one or more switches coupled to one of a gate line or a data line of the panel.

3. The method of claim 1, wherein the image is generated by voltage imaging using an array checker, wherein the voltage imaging comprises capacitively coupling an electro-optic modulator of the array checker to the panel, wherein the electro-optic modulator is locally opaque to illumination above the defect and the one or more reference lines when the electro-optic modulator is capacitively coupled to the panel, wherein the electro-optic modulator being locally opaque causes the electro-optic modulator to prevent the illumination from passing through to and reflect from the panel, wherein a detector of the array checker generates the image based on the illumination.

4. The method of claim 1, further comprising repairing the defect at the compensated defect location.

5. The method of claim 4, wherein a thin-film transistor array repair tool repairs the defect at the compensated defect location.

6. An array checker including:
an illumination source configured to generate illumination;
a stage for securing a panel;
an electro-optic modulator disposed in a path of the illumination and separated from the panel by an airgap;
a detector configured to generate an image of at least a portion of the panel; and
one or more processors configured to execute program instructions maintained on a memory medium causing the one or more processors to:
  activate one or more reference lines in an active area of the panel, wherein the one or more reference lines include a known reference line location in the active area;
  generate the image of at least the portion of the panel;
  detect, in the image, a defect location of a defect in the active area and a reference line location of the one or more reference lines;
  determine an offset between the reference line location and the known reference line location, wherein the offset corresponds to a shift in the defect location; and
  determine a compensated defect location of the defect based on the defect location and the offset, wherein the defect is in an active segment of the panel, wherein the active segment has a width of at least 30 micrometers.

7. The array checker of claim 6, wherein the array checker is configured to couple to one or more pads of the panel; wherein the array checker causes the one or more reference lines to activate by providing a control signal to one or more switches of the panel by way of the one or more pads, wherein the switches are coupled to one of a gate line of the panel or a data line of the panel.

8. The array checker of claim 6, wherein the electro-optic modulator is configured to capacitively couple to the panel; wherein the electro-optic modulator is locally opaque to the illumination above the defect and the one or more reference lines when the electro-optic modulator is capacitively coupled to the panel; wherein the electro-optic modulator being locally opaque causes the electro-optic modulator to prevent the illumination from passing through to and reflect from the panel.

9. An imaging system comprising:
a panel including an active area, a plurality of gate lines, and a plurality of data lines, wherein the active area includes a plurality of active segments; and
an array checker comprising:
  an illumination source configured to generate illumination;
  a stage for the panel;
  an electro-optic modulator disposed in a path of the illumination and separated from the panel by an airgap;
  a detector configured to generate an image of at least a portion of the panel; and
  one or more processors configured to execute program instructions maintained on a memory medium causing the one or more processors to:
    activate one or more reference lines in the active area of the panel, wherein the one or more reference lines include a known reference line location in the active area;
    generate the image of at least the portion of the panel;
    detect, in the image, a defect location of a defect in the active area and a reference line location of the one or more reference lines;
    determine an offset between the reference line location and the known reference line location, wherein the offset corresponds to a shift in the defect location; and
    determine a compensated defect location of the defect based on the defect location and the offset, wherein the defect is in an active segment of the panel, wherein the active segment has a width of at least 30 micrometers.

10. The imaging system of claim 9, wherein the panel includes one or more switches; wherein the one or more switches are coupled to one of a gate line of the plurality of gate lines or a data line of the plurality of data lines.

11. The imaging system of claim 1, wherein the panel includes a signal line coupling the one or more switches to one or more pads; wherein the array checker is coupled to the one or more pads; wherein the array checker causes the one or more reference lines to activate by providing a control signal to the one or more switches of the panel by way of the pad.

12. The imaging system of claim 11, wherein the one or more switches are coupled to one of the gate line or the data line outside of the active area; wherein the gate line is coupled to a row of active segments of the active area; wherein the data line is coupled to a column of active segments of the active area.

13. The imaging system of claim 12, wherein the one or more switches includes at least one switch coupled to the gate line for generating a horizontal reference line.

14. The imaging system of claim 12, wherein the one or more switches includes at least one switch coupled to the data line for generating a vertical reference line.

15. The imaging system of claim 12, wherein the one or more switches includes a first switch coupled to the gate line for generating a horizontal reference line; wherein the one or more switches includes a second switch coupled to the data line for generating a vertical reference line.

16. The imaging system of claim 9, wherein the panel is a liquid-crystal display panel including a thin-film transistor backplane.

17. The imaging system of claim 16, wherein the liquid-crystal display panel does not include a liquid crystal layer when the array checker generates the image.

18. The imaging system of claim 9, wherein the electro-optic modulator is configured to capacitively couple to the panel; wherein the electro-optic modulator is locally opaque to the illumination above the defect and the one or more reference lines when the electro-optic modulator is capacitively coupled to the panel; wherein the electro-optic modulator being locally opaque causes the electro-optic modulator to prevent the illumination from passing through to and reflect from the panel.

\* \* \* \* \*